(12) United States Patent
Wang et al.

(10) Patent No.: US 12,222,306 B2
(45) Date of Patent: Feb. 11, 2025

(54) MEASURING SYSTEM AND MEASURING METHOD FOR CONDUCTIVITY OF SUPERCRITICAL GEOTHERMAL FLUID

(71) Applicant: CHENGDU UNIVERSITY OF TECHNOLOGY, Chengdu (CN)

(72) Inventors: Yingchun Wang, Chengdu (CN); Haoxin Jia, Chengdu (CN); Xin Tang, Chengdu (CN); Shuang Liao, Chengdu (CN); Yuhe Fan, Chengdu (CN); Xiyan Zhou, Chengdu (CN); Gang Min, Chengdu (CN); Rongcai Song, Chengdu (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 0 days.

(21) Appl. No.: 18/663,123

(22) Filed: May 14, 2024

(65) Prior Publication Data

US 2024/0393280 A1 Nov. 28, 2024

(30) Foreign Application Priority Data

May 24, 2023 (CN) .......................... 202310593331.X

(51) Int. Cl.
*G01N 27/08* (2006.01)
*G01N 27/07* (2006.01)
*G01N 27/12* (2006.01)

(52) U.S. Cl.
CPC .......... *G01N 27/07* (2013.01); *G01N 27/123* (2013.01)

(58) Field of Classification Search
CPC ............................. G01N 27/123; G01N 27/07
See application file for complete search history.

(56) References Cited

U.S. PATENT DOCUMENTS 5,257,466 A * 11/1993 Kishi ...................... F23G 7/001
34/95
11,841,255 B2 * 12/2023 Xie .......................... G01F 1/36
(Continued)

FOREIGN PATENT DOCUMENTS

CN 116735666 A * 9/2023 ............. G01N 27/08
JP 10141211 A * 5/1998 ............. Y02E 10/10

OTHER PUBLICATIONS

Watanabe et al. "Viscosity-dependent empirical formula for electrical conductivity of H2O—NaCl fluids at elevated temperatures and high salinity". Aug. 8, 2021. Science Direct. p. 1-10. (Year: 2021).*

(Continued)

*Primary Examiner* — Jermele M Hollington
(74) *Attorney, Agent, or Firm* — Bayramoglu Law Offices LLC

(57) ABSTRACT

The invention pertains to a measuring system for the conductivity of supercritical geothermal fluid, featuring a reaction control unit with a reaction vessel lined with corundum ceramic and containing a stirrer, a pressure control unit including a booster pump connected to Ar gas and an air compressor, a flow control unit with a flowmeter, and a temperature control unit comprising a heating furnace with thermocouples both inside and outside the reaction chamber. An electrical signal monitoring unit with electrodes fitted through a corundum capillary into the ceramic lining measures current and voltage. The invention also details a method for measuring conductivity, highlighting how water-rock interactions in supercritical geothermal fluids affect conductivity changes.

4 Claims, 2 Drawing Sheets

(56) References Cited

U.S. PATENT DOCUMENTS

2010/0198547 A1\* 8/2010 Mulligan ............ E21B 41/0007
                                                    702/100
2017/0176368 A1\* 6/2017 Pennington ............ G01N 27/06
2017/0176369 A1\* 6/2017 Lambert ................ G01N 27/12

OTHER PUBLICATIONS

English translation of JP 10141211 A (Year: 1998).\*
English translation of CN 116735666 A (Year: 2023).\*

\* cited by examiner

MEASURING SYSTEM AND MEASURING METHOD FOR CONDUCTIVITY OF SUPERCRITICAL GEOTHERMAL FLUID

TECHNICAL FIELD

The invention relates to the field of new energy technology, in particular to a measuring system and a measuring method for conductivity of a supercritical geothermal fluid.

BACKGROUND ART

As a non-carbon-based clean energy, geothermal energy has the characteristics of good stability, high energy utilization coefficient, and convenient development and utilization, it is a very competitive renewable energy source. At present, it can be divided into shallow geothermal resources, hydrothermal geothermal resources, and dry hot rock geothermal resources according to the endowment conditions of geothermal resources, among which the hydrothermal geothermal resource is the main battlefield for current development and utilization. Obtaining high-grade thermal energy has always been the driving force for geothermal research. In recent years, supercritical geothermal fluid with ultra-high temperature (>374° C.) has become a hot spot in hydrothermal geothermal exploration and development. Supercritical geothermal fluid is a multi-component fluid with the characteristics of high temperature and high pressure (The critical point of pure water: T=374° C., P=22.1 MPa; the critical point of seawater: T=406° C., P=29.8 MPa), it is mostly hosted in basalts, and its formation is closely related to shallow magmatic activity. The supercritical geothermal fluid has the advantages of high enthalpy value (~3200 KJ/kg), low dynamic viscosity, and large geothermal productivity (single well-installed capacity can reach 50 MW), among them, the installed capacity of supercritical geothermal wells can reach 10 times that of conventional high-temperature (about 200-350° C.) geothermal wells. It is not difficult to see that promoting the exploration and development of supercritical geothermal resources can theoretically improve the understanding of the dynamic process of thermal energy convergence in the crust under high temperatures and high pressure. In reality, it has significant scientific and economic value in dealing with climate change, realizing energy structure adjustment, and promoting the realization of carbon peak carbon neutrality (dual carbon) goals.

Accurate identification of the scale and spatial distribution characteristics of supercritical geothermal fluid is the premise to promote its efficient development. Due to the significant difference in the conductivity of rocks and fluids, the magnetotelluric (MT) method is an effective geophysical tool for detecting underground fluids. At present, the electrical (magnetic) method has a wide range of application scenarios and has achieved remarkable results in the detection of conventional high-temperature geothermal reservoirs (depth of 5 km, the conductivity is generally less than 5 S/m). The electrical detection relies on the conductivity model of the molten body and the water-rich rock mass established by the indoor conductivity experiment, and the spatial conductivity characteristics of the underground medium can be established by collecting the field current and voltage data combined with the mathematical model inversion, and then the magma chamber and the conventional high-temperature geothermal fluid can be efficiently identified. Studies have confirmed that water-rock interaction can significantly affect fluid conductivity at low temperatures (~165° C.) and low pressure (5-10 MPa), mainly because some hydrothermal sulfides (such as pyrite) can change the conductivity of geological fluids by 1-3 orders of magnitude. It can be inferred that the effect of this sulfide on fluid conductivity in supercritical geothermal fluids with more intense geochemical processes may be more obvious. The supercritical geothermal fluid chemistry is controlled by magmatic volatiles, it has high concentrations of metal transport ligands (Cl, C, S, etc.), and the concentration of metal elements in geothermal fluids is high, which can provide a material basis for the precipitation of sulfides in supercritical geothermal fluids. In addition, the three-component system of supercritical geothermal systems has fluids with different temperature and pressure conditions, and its geochemical evolution process is more complex, boiling, degassing, precipitation, oxidation, and phase separation play different roles in different stages. These geochemical processes significantly change the physical properties of the fluid, such as density, viscosity, and electrical conductivity, which in turn restricts the accuracy of the detection of supercritical geothermal fluids by electrical methods.

SUMMARY

In order to solve the problems that existed in the existing technology, the purpose of the invention is to disclose a measuring system and a measuring method for conductivity of a supercritical geothermal fluid, the influence of supercritical geothermal fluid water-rock interaction on the change of conductivity can be identified through this invention.

In order to achieve the above purpose, the technical solution of the invention is as follows: a measuring system for conductivity of a supercritical geothermal fluid, comprising a reaction control unit, a pressure control unit, a flow control unit, a temperature control unit and an electrical signal monitoring unit; the reaction control unit comprises a reaction vessel, the reaction vessel is equipped with a corundum ceramic lining, a stirrer is set in a reaction chamber of the reaction vessel, and a rotational speed/temperature control instrument for controlling a water-rock reaction process is externally connected to the reaction chamber; the pressure control unit comprises a booster pump and a back pressure valve arranged on the reaction vessel, the booster pump is also connected to an Ar gas and an air compressor respectively; the flow control unit comprises a flowmeter, and a reaction gas is introduced into the reaction chamber through the flowmeter; the temperature control unit comprises a heating furnace wrapped outside the reaction vessel, and thermocouples for monitoring temperature are arranged inside and outside the reaction chamber of the reaction vessel, the electrical signal monitoring unit comprises two pairs of electrodes opposite to two sides of the reaction vessel, a corundum capillary tube is pressed into the corundum ceramic lining, the electrodes are set in the corundum capillary tube, and relative electrodes are connected to measure a current and a voltage.

As a further improvement of the invention, an annular space is designed between the reaction vessel and the corundum ceramic lining, the annular space is filled with distilled water, and the annular space is sealed with an O-ring at a top of the reaction vessel.

As a further improvement of the invention, the heating furnace is provided with an insulating sleeve.

As a further improvement of the invention, a calculation method of a fluid conductivity $\sigma_{fl}$ in the reaction vessel is as follows:

a current in the reaction chamber is $I_{fl}$, the current in the reaction chamber is determined by a potential difference $U_R$ of a fixed resistance:

$$I_{fl} = \frac{U_R}{R}$$

where $I_{fl}=I_t-I_l$, $I_t$ is a total current of a system and $I_l$ is a leakage current of the system;

as a temperature increases, recording the potential difference between the fixed resistance and a measuring unit continuously, and calculating the fluid conductivity $\sigma_{fl}$ by the potential difference and the current:

$$\frac{1}{\sigma_{fl}} = \frac{U_{fl}}{I_{fl}} \frac{1}{\tau}$$

where a parameter $\tau$ is a correlation constant of the measuring unit.

The invention also discloses a measuring method for conductivity of the supercritical geothermal fluid, the method adopts the supercritical geothermal fluid conductivity measuring system as described above, the method comprises the following:

establishing a fluid conductivity $\sigma_l$ model based on a temperature T, a density p, and a fluid salinity $\Theta$, a governing equation is as follows:

$$\log(\sigma_l) = -1.706 - 93.78/T + 0.8075\log(\Theta) + 3.0781\log(\rho) + \log(\Lambda(T, p))$$

where $\Lambda$ (T, p) is a molar conductivity controlled by temperature and pressure, it is related to a solution viscosity μ, the formula is as follows:

$$\Lambda = A + B\mu^{-1} + C\mu^{-2}$$

where coefficients A, B, and C are functions of a molar concentration m, the coefficients A, B, and C are as follows:

$$A = a_1 + (a_2 - a_1)\left[1 + \left(\frac{m}{a_3}\right)^{a_4}\right]^{-1}$$

$$B^{-1} = \left[b_1 + (b_2 - b_1)\left[1 + \left(\frac{\sqrt{m}}{b_3}\right)^{b_4}\right]^{-1}\right] \cdot 10^6$$

$$C = c_1 + c_2 m$$

where $a_1$, $a_2$, $a_3$, $a_4$, $b_1$, $b_2$, $b_3$, $b_4$, $c_1$, $c_2$ are coefficients;

the solution viscosity μ is controlled by the salinity $\Theta$, the temperature T and the pressure P, and an equation is as follows:

$$\mu(P, T, \Theta) = \frac{\mu_{H_2O}(T,P)(1+3\Theta)\left(\frac{800-T}{800}\right)^9}{\left(\frac{800-T}{800}\right)^9 + \left(\frac{T}{800}\right)^9} + \frac{(\mu_{H_2O}(T,P)(1-\Theta) + \mu_{NaCl}^{800}\Theta)\left(\frac{T}{800}\right)^9}{\left(\frac{800-T}{800}\right)^9 + \left(\frac{T}{800}\right)^9}$$

where $\mu_{H_2O}$(T, P), is a pure water viscosity at a given temperature and pressure, state, $\mu_{NaCL}^{800}$ is a melt viscosity at 800° C.;

the solution density is as follows:

$$\rho_{NaCl,l} = \frac{\rho^0_{NaCl,l}}{1 - 0.11\ln(1 + 10P\lambda_{NaCl,l})}$$

where a reference density under 1 bar pressure:

$$\rho^0_{NaCl,l} = \frac{m_0}{m_1 + m_2 T + m_3 T^2}$$

a solution compressibility coefficient:

$$\lambda_{NaCl,l} = m_4 + m_5 T$$

where $m_0$, $m_1$, $m_2$, $m_3$, $m_4$, $m_5$ are coefficients;

a whole-rock conductivity is estimated by an Archie formula:

$$\sigma_r = \frac{1}{\alpha}\sigma_l \phi^m s_l^n$$

where $\sigma_r$ is a conductivity of fluid-bearing rock, φ is a porosity of rock, $s_l$ is a saturation of salt water, m is a relevant parameter of rock, n is a saturation index, and α is a coefficient factor.

The beneficial effects of the invention are as follows:

1. The influence of supercritical geothermal fluid water-rock interaction on electrical conductivity, the influence of supercritical geothermal fluid water-rock interaction on the change of conductivity can be identified by setting the supercritical water-rock reaction under different water-rock ratios and monitoring the change of fluid conductivity.

2. The influence of supercritical geothermal fluid corrosion on the measuring electrodes, the instrument is embedded in a 5 mm thick corundum lining through a high-pressure tube, and the corundum capillary tube is pressed into the corundum lining, and the Pt electrodes are placed in the capillary tube to solve the corrosion of the supercritical geothermal fluid to the measuring electrodes.

3. The leakage protection of the experimental equipment system during the measurement process. In order to prevent the annular leakage between the ceramic lining and the stainless-steel pressure chamber, the instrument uses a protective device to place the same potential on the measuring electrodes and the stainless steel.

1, reaction vessel, 2, corundum ceramic lining, 3, stirrer, 4, speed/temperature control instrument, 5, booster pump, 6, back pressure valve, 7, Ar gas, 8, air compressor, 9, flowmeter, 10, reaction gas, 11, heating furnace, 12, thermocouple, 13, electrode, 14, corundum capillary tube, 15, insulating sleeve.

DETAILED DESCRIPTION OF THE EMBODIMENTS

The following is a detailed description of the embodiment of the invention in combination with the attached figures.

EMBODIMENT

Figure 1:
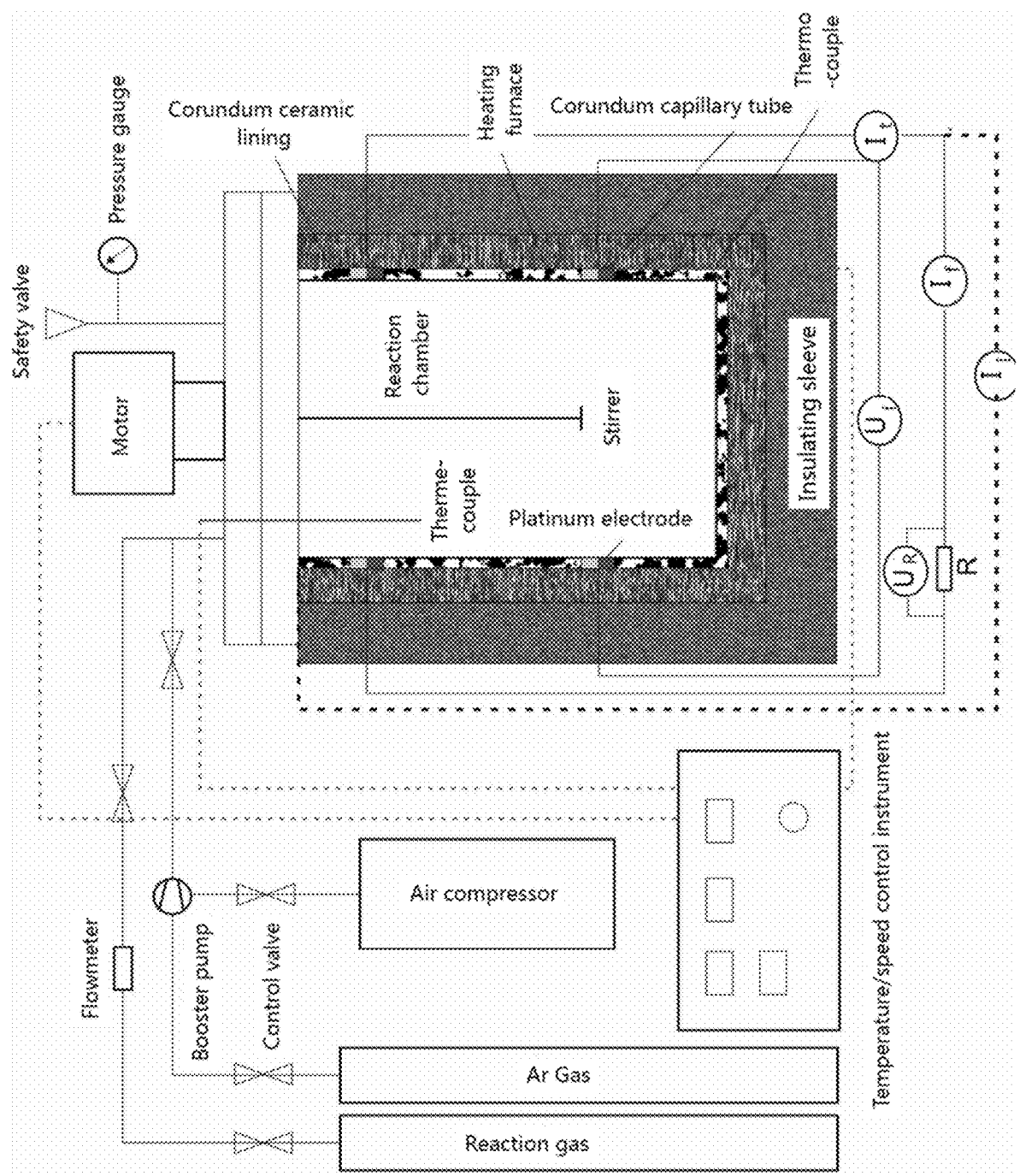
FIG. 1 is a structure diagram of the measuring system in the embodiment of the invention.

As shown in FIG. 1, a measuring system for conductivity of the supercritical geothermal fluid, comprising a reaction control unit, a pressure control unit, a flow control unit, a temperature control unit and an electrical signal monitoring unit; the reaction control unit comprises a reaction vessel 1, the reaction vessel 1 is equipped with a corundum ceramic lining 2, a stirrer 3 is set in a reaction chamber of the reaction vessel 1, and a rotational speed/temperature control instrument 4 for controlling the water-rock reaction process is externally connected to the reaction chamber; the pressure control unit comprises a booster pump 5 and a back pressure valve 6 arranged on the reaction vessel 1, the booster pump 5 is also connected to an Ar gas 7 and an air compressor 8 respectively; the flow control unit comprises a flowmeter 9, and a reaction gas 10 is introduced into the reaction chamber through the flowmeter 9; the temperature control unit comprises a heating furnace 11 wrapped outside the reaction vessel 1, and thermocouples 12 for monitoring temperature are arranged inside and outside the reaction chamber of the reaction vessel 1, the electrical signal monitoring unit comprises two pairs of electrodes 13 opposite to two sides of the reaction vessel 1, a corundum capillary tube 14 is pressed into the corundum ceramic lining 2, the electrodes 13 are set in the corundum capillary tube 14, and relative electrodes 13 are connected to measure the current and the voltage.

In this embodiment, an annular space is designed between the reaction vessel and the corundum ceramic lining, the annular space is filled with distilled water, and the annular space is sealed with an O-ring at the top of the reaction vessel.

In this embodiment, the heating furnace 11 is provided with an insulating sleeve.

The following is a further explanation of the measuring system:

Reaction control: a pressure-resistant stainless steel with a capacity of 800 mL is used as the reaction vessel 1, and the corundum ceramic lining 2 with a thickness of 5 mm is arranged in the reaction vessel 1 due to the high corrosion of supercritical geothermal fluid. In order to prevent the corundum ceramic lining 2 from cracking at high temperature, there is an annular space between the reaction vessel 1 and the corundum ceramic lining 2, which is filled with distilled water, and the annular space is sealed with an O-ring at the mouth of the vessel, the stirrer 3 is connected through the top cover of the container, and the rotational speed/temperature control instrument 4 is connected to control the water-rock reaction process. The reaction chamber is sealed by the top cover with a hard pressure.

Pressure control: In order to maintain the pressure in the reaction chamber, especially when the temperature exceeds 374° C., pressure fluctuation is easy to occur, this set of equipment specially sets the booster pump 5 and the back pressure valve 6 for pressure regulation, and ensures the stability of the pressure in the chamber with the help of Ar gas 7 filling; when the pressure in the chamber is too high, the back pressure valve 6 can relieve the pressure.

Flow control: By connecting a one-way flowmeter 9, a quantitative reaction gas 10 (such as H$_2$S) can be introduced into the reaction chamber.

Temperature control: There is a heating furnace 11 wrapped outside the reaction chamber, which is heated by electricity, at the same time, there are thermocouples 12 arranged inside and outside the reaction chamber to monitor the temperature. The temperature in the reaction chamber is controlled by Pt/Pt—Rh thermocouples, and the reaction temperature is monitored and controlled in real-time. In addition, there is a water cooling system outside the chamber, which is enabled when the temperature is too high.

Electrical signal monitoring: the electrode 13 connection to measure the current and voltage can be measured mainly through the connection of the electrodes 13. In order to prevent the corrosion of the measuring electrode 13, a corundum capillary tube 14 with an outer diameter of 4.5 mm is pressed between the corundum ceramic lining 2 and placed symmetrically on both sides of the vessel, the corundum capillary tube 14 is separated from the reaction fluid by a filter, and two pairs of Pt electrodes are pressed into the corundum capillary tube 14, the spacing of the upper Pt electrode and the lower Pt electrode is 40 mm, this spacing is used as the conductivity measuring unit. The fluid conductivity uses a four-electrode measuring unit to eliminate the polarization effect on the electrodes, the polarization effect causes the contact resistance between the electrode and the fluid sample to increase the measurement resistance. The current I$_{fl}$ in the reaction chamber is determined by the potential difference U$_R$ of the fixed resistance.

$$I_{fl} = \frac{U_R}{R}$$

where $I_{fl}=I_t-I_l$, $I_t$ is a total current of the system and $I_l$ is a leakage current of the system. As the temperature increases, the potential difference between the fixed resistance and the measuring unit is recorded continuously, and the fluid conductivity $\sigma_{fl}$ is calculated by the potential difference and the current:

$$\frac{1}{\sigma_{fl}} = \frac{U_{fl}}{I_{fl}} \frac{1}{\tau}$$

where the parameter $\tau$ is a correlation constant of the measuring unit, which is obtained by measuring distilled water, tap water, 0.01 mol, and 0.1 mol NaCl saturated solution, the thermal expansion difference between the ceramic lining and the stainless steel will be ignored during the measuring process.

The embodiment also discloses a measuring method for conductivity of the supercritical geothermal fluid, comprises the following:

Considering the fluid conductivity ($\sigma_l$ [S/m]) model based on the temperature (T [K]), the density ($\rho$ [kg/m$^3$]), and the fluid salinity ($\Theta'$ [wt %]), the governing equation is as follows:

$$\log(\sigma_l) = -1.706 - 93.78/T + 0.8075\log(\Theta') + 3.0781\log(\rho) + \log(\Lambda(T, p))$$

where $\Lambda$ (T, p) [S·m$^2$/mol] is a molar conductivity controlled by temperature and pressure, it is related to a solution viscosity u, the formula is as follows:

$$\Lambda = A + B\mu^{-1} + C\mu^{-2}$$

where coefficients A, B, and C are functions of a molar concentration m, the coefficients A, B, and C are as follows:

$$A = a_1 + (a_2 - a_1)\left[1 + \left(\frac{m}{a_3}\right)^{a_4}\right]^{-1}$$

$$B^{-1} = \left[b_1 + (b_2 - b_1)\left[1 + \left(\frac{\sqrt{m}}{b_3}\right)^{b_4}\right]^{-1}\right] \cdot 10^6$$

$$C = c_1 + c_2 m$$

where the coefficients $a_1$=4.16975E-3, $a_2$=−5.08206E-3, $a_3$=0.575588, $a_4$=1.00422, $b_1$=25.5008, $b_2$=6.04911E-2, $b_3$=2.51861E6, $b_4$=0.430952, $c_1$=−4.89245E-10, $c_2$=−1.75339E-11.

Figure 2:
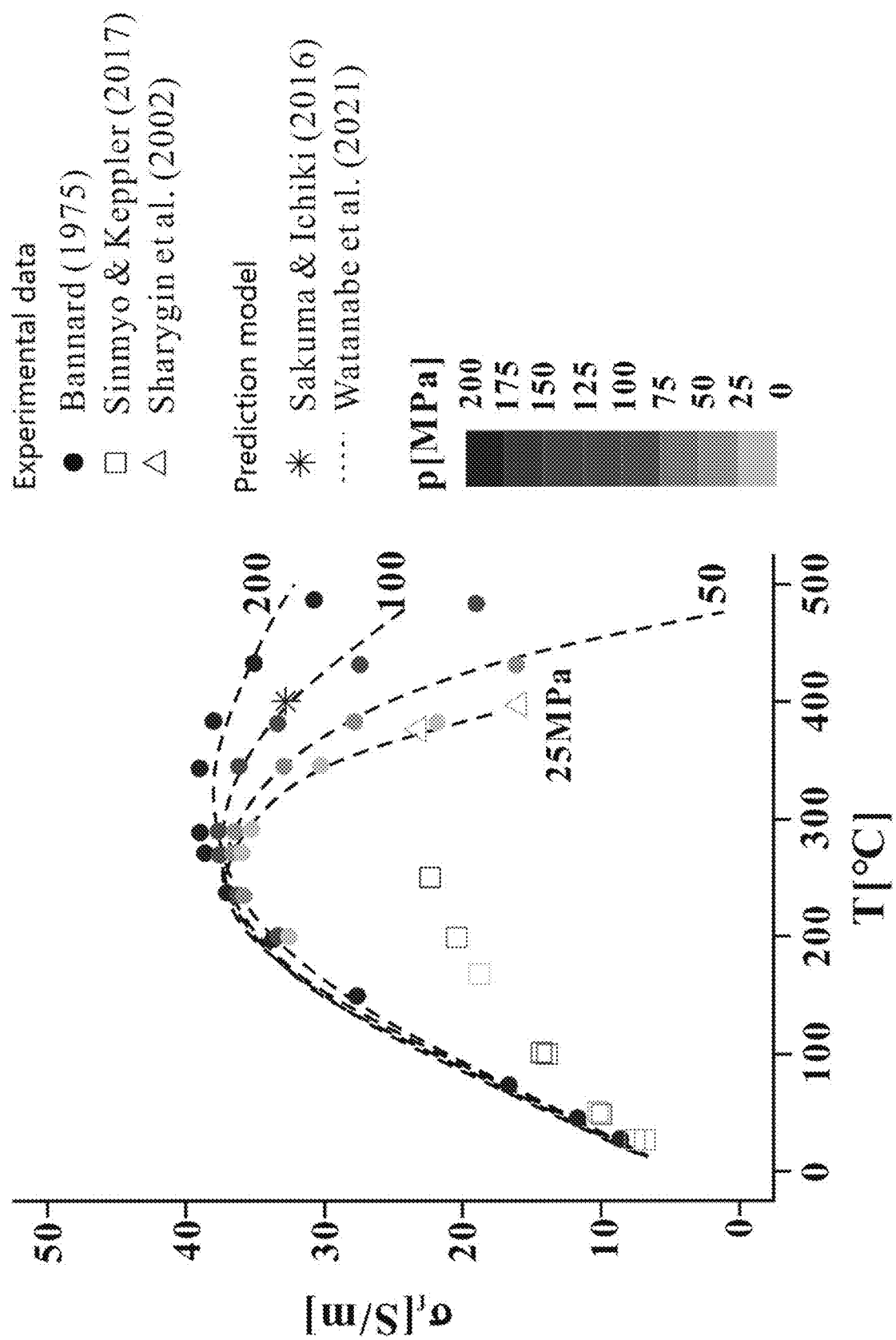
FIG. 2 is a comparison of the conductivity measuring results and the conductivity model prediction of the NaCl—H$_2$O system at a salinity of about 5.6 wt % (1MNaCl at room temperature) and a pressure of less than 200 MPa.

The solution viscosity u is controlled by salinity Q' [wt %], temperature T [K], and pressure P [MPa], the equation is as follows:

$$\mu(P, T, \Theta') = \frac{\mu_{H_2O}(T, P)(1 + 3\Theta')\left(\frac{800-T}{800}\right)^9}{\left(\frac{800-T}{800}\right)^9 + \left(\frac{T}{800}\right)^9} + \frac{(\mu_{H_2O}(T, P)(1 - \Theta') + \mu_{NaCl}^{800}\Theta')\left(\frac{T}{800}\right)^9}{\left(\frac{800-T}{800}\right)^9 + \left(\frac{T}{800}\right)^9}$$

where $\mu_{H_2O}$ (T, P) is a pure water viscosity at the given temperature and pressure state, $\mu_{NaCL}^{800}$, a melt viscosity at 800° C.;

the solution density is as follows:

$$\rho_{NaCl,l} = \frac{\rho_{NaCl,l}^0}{1 - 0.11\ln(1 + 10P\lambda_{NaCl,l})}$$

where the reference density under 1 bar pressure:

$$\rho_{NaCl,l}^0 = \frac{m_0}{m_1 + m_2 T + m_3 T^2}$$

the solution compressibility coefficient:

$$\lambda_{NaCl,l} = m_4 + m_5 T$$

where the coefficient $m_0$=58443; $m_1$=23.772; $m_2$=0.018639; $m_3$=−1.9687E-6; $m_4$=−1.5259E-5; $m_5$=5.5058E-8;

Supercritical geothermal fluid conductivity applications:
1. Magma, Ore-Forming Hydrothermal, Supercritical Geothermal Fluid NaCl—H$_2$O System:

The fluid conductivity characteristics under different temperatures (0-800° C.), different pressures (0-1020 MPa), and different salinities (0-24.6 wt % NaCl) are mainly studied. When the constant concentration of NaCl is heated at a fixed pressure, the conductivity of the solution increases significantly and reaches a maximum value near 300° C., and then the conductivity decreases when the temperature increases (FIG. 2). it is controlled by ion activity and ion concentration and is closely related to the changes in physical and chemical properties (density, viscosity, dielectric constant) of water. When the temperature rises, the viscosity of water decreases, and the ionic activity in the solution increases, so the conductivity increases. Due to the constant pressure, the increase in temperature reduces the fluid density and the electrolyte concentration. When the temperature exceeds 300° C., the dielectric constant of water is greatly reduced, thereby inhibiting the ionization of NaCl, resulting in a rapid decrease in the concentration of Na$^+$ and Cl$^−$, and a decrease in the conductivity of the solution. When the solution undergoes a mineral precipitation-dissolution process due to changes in temperature and pressure, the solution ion concentration will be changed, which in turn affects the fluid conductivity, as shown in FIG. 2.

2. Magnetotelluric Detection of Supercritical Geothermal Fluid:

It is necessary to estimate the possible contribution of magmatic fluids to the electrical conductivity of the system in order to interpret magnetotelluric measurements successfully. It is assumed that the electrical conduction in the granite is dominated by pore fluid conduction, and the porosity and range of the reservoir can be estimated from magnetotelluric measurements according to the reasonable assumptions of fluid conductivity, pore geometry and connectivity, However, it is necessary to understand the in-situ pressure, temperature and salinity conditions to estimate the conductivity of the fluid, because the in-situ conditions may significantly affect the properties of the fluid. The saltwater dissolved from the crystalline melt rises rapidly through a sub-vertical hydraulic pipe, which may be a static high permeability zone or a dynamic permeability build-up. There is no overall fluid cooling. When the fluid channel is not connected to the hydrostatic pressure zone, the fluid can rise under near hydrostatic pressure. When the magmatic-hydrothermal system is connected to a shallower hydrostatic layer, the fluid pressure can be reduced to near hydrostatic pressure, for example, the magmatic-hydrothermal system connects to the hydraulic fracturing of the sealing layer. Due to the occurrence of mineral precipitation (such as quartz, and rock salt) or rocks transform from brittleness to toughness, the pressure may increase again after the fracture layer is self-closed.

The whole-rock conductivity is estimated by an Archie formula:

$$\sigma_r = \frac{1}{\alpha}\sigma_l\phi^m s_l^n$$

where $\sigma_r$ is a conductivity of fluid-bearing rock, $s_1$ is a saturation of salt water, m is a relevant parameter of rock (=1.9), n is a saturation index (≈2), and $\alpha$ is a coefficient factor (=0.6).

The above embodiment only expresses a specific implementation method of the invention, and the description of this embodiment is more specific and detailed, but they cannot be understood as restrictions on the scope of protection of this invention. It should be pointed out that for ordinary technicians in this field, some deformations and improvements can be made without deviating from the idea of the invention, the deformations and improvements are all within the protection scope of the invention.

What is claimed is:

1. A measuring method for conductivity of a supercritical geothermal fluid, said method utilizing a measuring system for conductivity of the supercritical geothermal fluid, said system comprising a reaction control unit, a pressure control unit, a flow control unit, a temperature control unit and an electrical signal monitoring unit; the reaction control unit comprises a reaction vessel, the reaction vessel is equipped with a corundum ceramic lining, a stirrer is set in a reaction chamber of the reaction vessel, and a rotational speed/temperature control instrument for controlling a water-rock reaction process is externally connected to the reaction chamber; the pressure control unit comprises a booster pump and a back pressure valve arranged on the reaction vessel, the booster pump is also connected to an Ar gas and an air compressor respectively; the flow control unit comprises a flowmeter, and a reaction gas is introduced into the reaction chamber through the flowmeter; the temperature control unit comprises a heating furnace wrapped outside the reaction vessel, and thermocouples for monitoring temperature are arranged inside and outside the reaction chamber of the reaction vessel, the electrical signal monitoring unit comprises two pairs of electrodes opposite to two sides of the reaction vessel, a corundum capillary tube is pressed into the corundum ceramic lining, the electrodes are set in the corundum capillary tube, and relative electrodes are connected to measure a current and a voltage, wherein the method comprises:

establishing a fluid conductivity $\sigma_1$ model based on a temperature T controlled by via the heating furnace, a fluid density $\rho$, and a fluid salinity $\Theta$, a governing equation is as follows:

$$\log(\sigma_l) = -1.706 - 93.78/T + 0.8075\log(\Theta) + 3.0781\log(\rho) + \log(\Lambda(T, p))$$

where $\Lambda$ (T, P) is a molar conductivity controlled by the temperature T and a pressure P controlled via the booster pump and the back pressure valve, and is related to a fluid viscosity $\mu$ as follows:

$$\Lambda(T, P) = A + B\mu^{-1} + C\mu^{-2}$$

where coefficients A, B, and C are functions of a molar concentration m, the coefficients A, B, and C are as follows:

$$A = a_1 + (a_2 - a_1)\left[1 + \left(\frac{m}{a_3}\right)a_4\right]^{-1}$$

-continued $$B^{-1} = \left[b_1 + (b_2 - b_1)\left[1 + \left(\frac{\sqrt{m}}{b_3}\right)^{b_4}\right]^{-1}\right] \cdot 10^6$$

$$C = c_1 + c_2 m$$

where $a_1$, $a_2$, $a_3$, $a_4$, $b_1$, $b_2$, $b_3$, $b_4$, $c_1$, $c_2$ are coefficients;

the fluid viscosity $\mu$ is controlled by the salinity $\Theta$, the temperature T and the pressure P, and an equation is as follows:

$$\mu(P, T, \Theta) = \frac{\mu_{H_2O}(T, P)(1+3\Theta)\left(\frac{800-T}{800}\right)^9}{\left(\frac{800-T}{800}\right)^9 + \left(\frac{T}{800}\right)^9} + \frac{(\mu_{H_2O}(T, P)(1-\Theta) + \mu_{NaCl}^{800}\Theta)\left(\frac{T}{800}\right)^9}{\left(\frac{800-T}{800}\right)^9 + \left(\frac{T}{800}\right)^9}$$

where $\mu_{H_2O}(T,P)$ is a pure water viscosity at a given temperature and pressure state, $\mu_{NaCl}^{800}$ is a melt viscosity at 800° C.;

the fluid density is as follows:

$$\rho =$$

$$\rho_{NaCl,l} = \frac{\rho_{NaCl,l}^0}{1 - 0.11\ln(1 + 10P\lambda_{NaCl,l})}$$

where a reference density under 1 bar pressure:

$$\rho_{NaCl,l}^0 = \frac{m_0}{m_1 + m_2T + m_3T^2}$$

a fluid compressibility coefficient:

$$\lambda_{NaCl,l} = m_4 + m_5T$$

where $m_0$, $m_1$, $m_2$, $m_3$, $m_4$, $m_5$ are coefficients;
a fluid-bearing rock conductivity $\sigma_r$ is estimated by an Archie formula:

$$\sigma_r = \frac{1}{\alpha}\sigma_l\phi^m s_l^n$$

where $\varphi$ is a porosity of rock, $s_l$ is a saturation of salt water, m is a relevant parameter of rock, n is a saturation index, and $\alpha$ is a coefficient factor.

2. The measuring method for conductivity of the supercritical geothermal fluid according to claim 1, wherein an annular space is designed between the reaction vessel and the corundum ceramic lining, the annular space is filled with distilled water, and the annular space is sealed with an O-ring at a top of the reaction vessel.

3. The measuring method for conductivity of the supercritical geothermal fluid according to claim 1, wherein the heating furnace is provided with an insulating sleeve.

4. The measuring method for conductivity of the supercritical geothermal fluid according to claim 1, wherein a calculation method of a fluid conductivity $\sigma_{fl}$ in the reaction vessel is as follows:

a current in the reaction chamber is $I_{fl}$, the current in the reaction chamber is determined by a potential difference $U_R$ of a fixed resistance:

$$I_{fl} = \frac{U_R}{R}$$

where $I_{fl}=I_t-I_l$, $I_t$ is a total current of a system and $I_l$ is a leakage current of the system;

as a temperature increases, recording a potential difference $U_{fl}$ between the fixed resistance and a measuring unit continuously via the relative electrodes, and calculating the fluid conductivity $\sigma_{fl}$ by the potential difference and the current:

$$\frac{1}{\sigma_{fl}} = \frac{U_{fl}}{I_{fl}} \frac{1}{\tau}$$

where a parameter $\tau$ is a correlation constant of the measuring unit.

\* \* \* \* \*